(12) United States Patent
Sakai

(10) Patent No.: US 7,170,258 B2
(45) Date of Patent: Jan. 30, 2007

(54) ELECTRICAL DEVICE FOR CHARGING BATTERIES

(75) Inventor: Yoshihiro Sakai, Fukushima (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 10/825,258

(22) Filed: Apr. 15, 2004

(65) Prior Publication Data

US 2004/0212343 A1    Oct. 28, 2004

(30) Foreign Application Priority Data

Apr. 28, 2003   (JP)   ............................ P2003-124432

(51) Int. Cl.
*H01M 10/46*   (2006.01)
(52) U.S. Cl. .................................................... 320/111
(58) Field of Classification Search ................ 320/107, 320/111, 112, 115; 439/131, 170, 171, 172, 439/173, 174, 638, 956
See application file for complete search history.

(56) References Cited

U.S. PATENT DOCUMENTS 4,086,523 A * 4/1978 Izumi ......................... 320/111
4,794,315 A * 12/1988 Pederson et al. ........... 320/111
5,006,779 A * 4/1991 Fenne et al. ................ 320/111
5,057,381 A * 10/1991 Persen ........................ 320/111
6,275,002 B1 * 8/2001 Chen .......................... 320/111

* cited by examiner

*Primary Examiner*—Edward H. Tso
(74) *Attorney, Agent, or Firm*—Sonnenschein Nath & Rosenthal LLP

(57) ABSTRACT

An AC plug of a battery charger is arranged so as to be enclosed into a casing of the battery charger or projected therefrom when it is laterally rotated. The AC plug has two conductive blades and an edge surface for projecting them at an almost right angle. A first surface and a first rotary shaft are provided for a first side surface. A second surface and a second rotary shaft are provided for a second side surface opposite to the first side surface. A first contact portion electrically connected to one conductive blade is projected from the first rotary shaft. A second contact portion electrically connected to the other conductive blade is projected from the second rotary shaft. Conductive spring terminals which are elastically come into contact with the front edges of the first and second contact portions are provided for a board in the casing. By reducing a rotational radius of each contact portion, a small battery charger is provided.

3 Claims, 8 Drawing Sheets

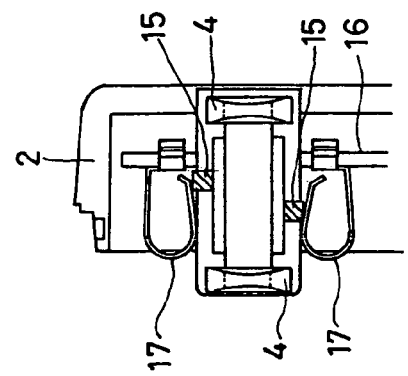
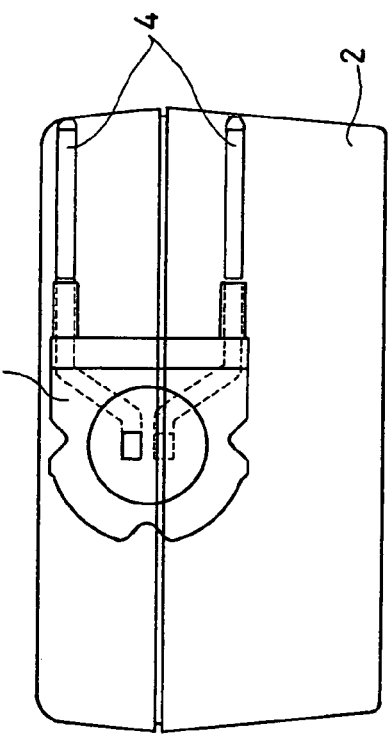
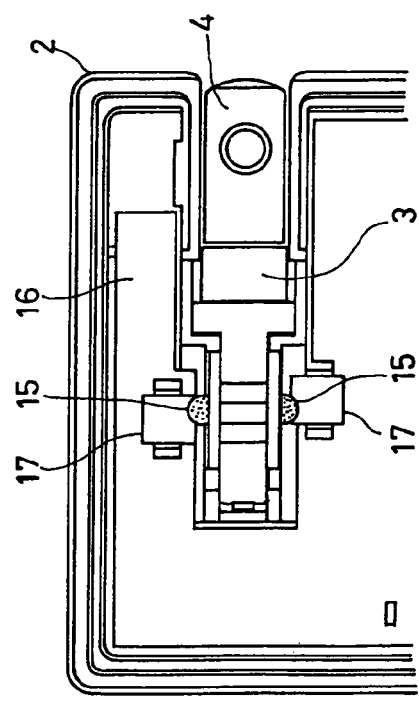

ELECTRICAL DEVICE FOR CHARGING BATTERIES

BACKGROUND OF THE INVENTION

1. Field of the Invention

The invention relates to a battery charger and, more particularly, to a battery charger which can be enclosed into a casing of a main body by rotating an AC plug.

2. Description of the Related Arts

In recent years, a large variety of portable apparatuses including digital video cameras, digital still cameras, and the like have been accepted by various generations and widely used. Most of these portable apparatuses use batteries as power sources. Particularly, in recent years, with the advancement of battery technology, increase in recycling consciousness of the users, or the like, many portable apparatuses can be powered by chargeable batteries (for example, lithium-ion battery).

In accordance with an increase in demand for such a chargeable battery, many battery chargers for charging the battery by using an AC power source have been sold. Conventional battery chargers include a battery charger in which an AC plug can be enclosed in a charger main body (refer to JP-A-6-38388) and a battery charger having a contact member by which a charger main body and an AC plug can contact each other (refer to the Official Gazette of Japanese Utility Model Registration Application No. 5-88152). According to JP-A-6-38388, the AC plug is rotated around a rotary shaft, as a center, which penetrates a supporting portion for supporting two conductive blades which the AC plug has, so that the AC plug is projected by 90° from the main body of the charger and inserted into an outlet of an AC power source. In this case, the AC plug is rotated in the direction of plate surfaces of the two blades.

On the other hand, in a construction similar to that in which the AC plug is rotated around the rotary shaft, as a center, which penetrates the supporting portion for supporting the conductive blades, so that the AC plug is projected by 90° from the charger main body, there is a type in which the AC plug is rotated in the direction which perpendicularly crosses the plate surfaces of the two blades (what is called a lateral rotating type). In the present specification, a form of the rotation of the AC plug like such a lateral rotating type as mentioned above is called "lateral rotation".

Examples of conventional battery chargers which belong to such a type are shown in FIGS. 1A, 1B, and 2. FIGS. 1A and 1B are a side elevational view (FIG. 1A) and a top view (FIG. 1B) showing a state where an AC plug which is inserted into an outlet of an AC power source is projected at an angle of about 90° to a casing of a battery charger.

FIG. 1A shows a state where an AC plug 51 having two conductive blades 52, an AC plug rotary shaft 53, and contact portions 54 which contact and are electrically connected to the conductive blades, which project at an almost right angle to a casing 50 of a battery charger. The AC plug 51 can be laterally rotated around the AC plug rotary shaft 53 as a center by about 90° in the direction of an arrow (d). By such a rotation, the AC plug 51 is enclosed into the casing 50. The contact portions 54 are arranged on the surface of the AC plug rotary shaft 53. The contact portions 54 are electrically connected to the corresponding conductive blades 52.

The contact portions 54 are arranged around an outer peripheral surface portion of the circular AC plug rotary shaft 53 so as to face each other while sandwiching a center point of the AC plug rotary shaft 53. In the state shown in FIG. 1A, the contact portions 54 contact two corresponding conductive spring terminals 55 and are electrically connected thereto.

When the AC plug 51 is rotated by about 90° in the direction of the arrow (d), the portion of the AC plug rotary shaft 53 is also similarly rotated in the direction of the arrow (d). Therefore, the contact portions 54 arranged on the surface of the AC plug rotary shaft 53 are also rotated in the direction of the arrow (d), so that the contact portion 54 is away from each corresponding conductive spring terminal 55 so as to keep a predetermined distance.

A contact state of the contact portions 54 and the conductive spring terminals 55 is more clearly illustrated in FIG. 1B. A cavity portion 56 is a space for enclosing the conductive blades 52 when the AC plug 51 is laterally rotated by about 90° in the direction of the arrow (d) in FIG. 1A.

FIG. 2 is a perspective view showing a portion around the AC plug 51 in the case where the AC plug 51 is in a state shown in FIGS. 1A and 1B as mentioned above, that is, a state where the blades 52 are projected at an almost right angle to the casing 50.

According to the battery charger of this type, as shown in FIG. 1A, the contact portions 54 of the poles are arranged on the same side of the surface of the AC plug rotary shaft 53 of the AC plug 51.

However, in the conventional battery charger, since the two contact portions are arranged only on one surface of the AC plug rotary shaft as mentioned above, one problem is that a distance between the two contact portions has to be set to a predetermined value or more in order to satisfy safety standards. According to UL (Underwriters Laboratories) 1310 as a safety standard, 6.4 mm or more has to be assured as a distance between the contact portions in this case.

Further, another problem of conventional battery chargers is that the rotary shaft portion of the AC plug and the conductive spring terminals have to be enlarged because the distance between the two contact portions is set to the predetermined value or more. Consequently, a predetermined space is necessary in the portion around the rotary shaft of the AC plug and the battery charger cannot be miniaturized.

OBJECTS AND SUMMARY OF THE INVENTION

It is, therefore, an object of the invention to provide a small battery charger in which a portion around a rotary shaft of an AC plug can be constructed by a smaller space.

According to a preferred aspect of the invention, the above object is accomplished by a battery charger having the following construction, that is, a battery charger which has an AC plug adapted to be connected to an AC power source, converts the AC power source into a DC power source, and charges a battery, wherein: the AC plug has a first conductive blade, a second conductive blade, and a supporting portion for partially supporting the first conductive blade and the second conductive blade; by rotating the AC plug in the direction which perpendicularly crosses plate surfaces of the first conductive blade and the second conductive blade, the AC plug is enclosed into a casing of the battery charger or moved to a position projecting from the casing of the battery charger; the supporting portion has an edge surface from which a part of the first conductive blade and a part of the second conductive blade are projected at an almost right angle, a first surface which perpendicularly crosses the edge surface and forms a first side surface of the AC plug, a second surface which forms a second side surface opposite to the first side surface, a first rotary shaft projecting from the first surface to the outside, and a second rotary shaft projecting from the second surface to the outside; a first contact portion electrically connected to the first conductive blade is projected from the first rotary shaft; a second contact portion electrically connected to the second conductive blade is projected from the second rotary shaft; and a first conductive spring terminal which is elastically come into contact with a front edge of the first contact portion and a second conductive spring terminal which is elastically come into contact with a front edge of the second contact portion are provided for a board provided in the casing.

According to the invention, since a rotational radius of each of the first contact portion and the second contact portion is suppressed to a small value, a size of portion around the rotary shaft of the AC plug including the first conductive spring terminal and the second conductive spring terminal can be reduced. Thus, the battery charger of a small size can be provided in the end.

The above and other objects and features of the present invention will become apparent from the following detailed description and the appended claims with reference to the accompanying drawings.

BRIEF DESCRIPTION OF THE DRAWINGS

FIGS. 7A to 7C are schematic diagrams showing a battery charger in which the AC plug according to the embodiment of the invention is assembled;

DETAILED DESCRIPTION OF THE PREFERRED EMBODIMENT

Figure 1A:
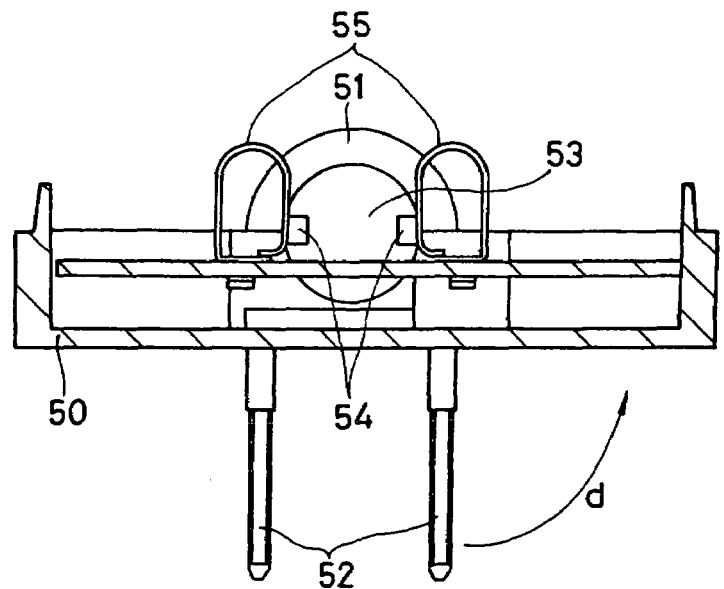
FIGS. 1A and 1B are schematic diagrams showing a construction of conventional battery charger and AC plug.
Figure 1B:
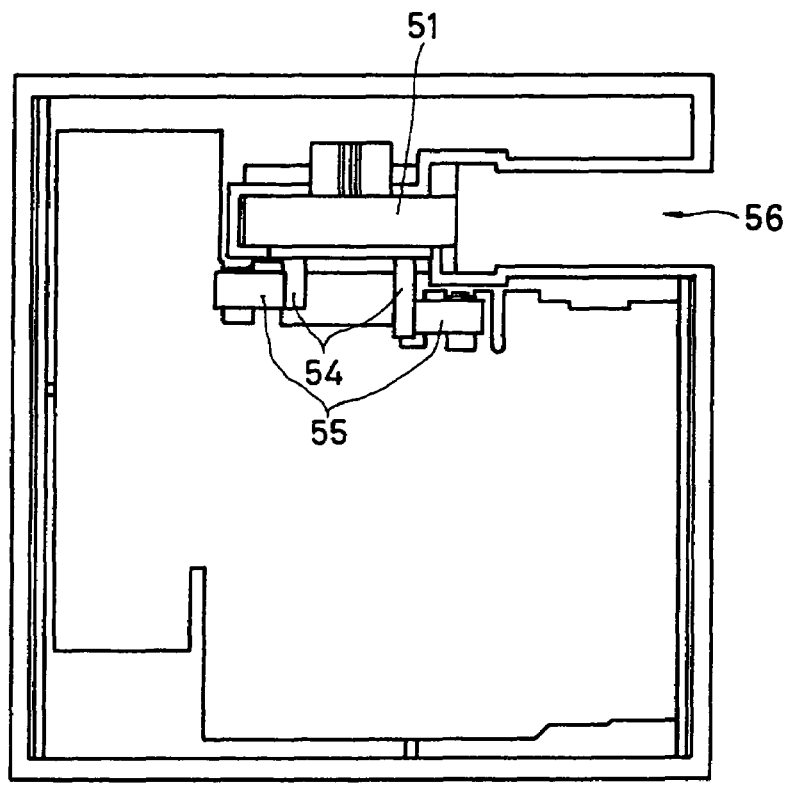
Figure 2:
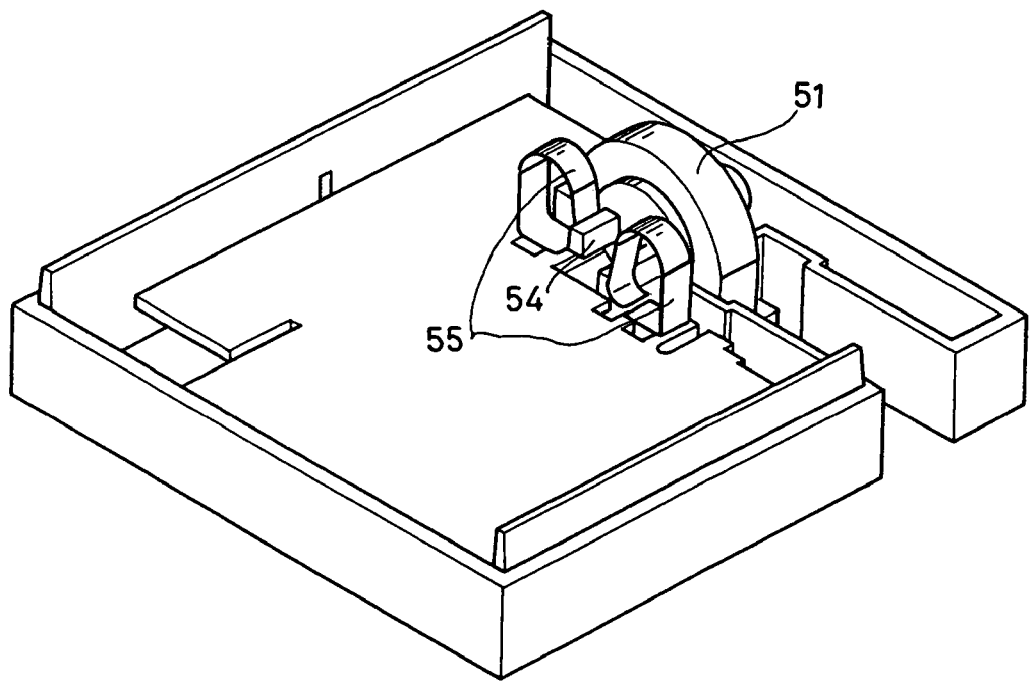
FIG. 2 is a schematic diagram showing another construction of the conventional battery charger and AC plug.
Figure 3A:
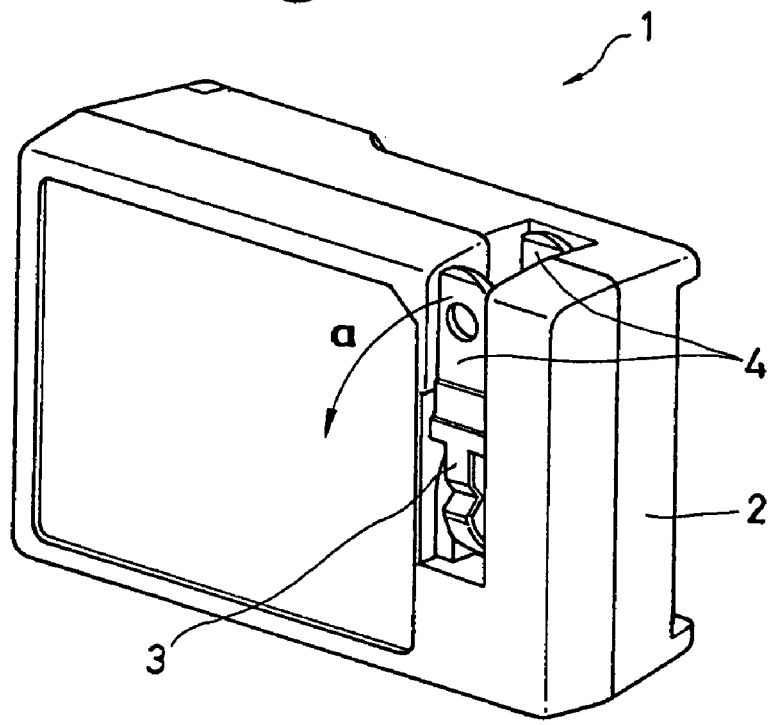
FIGS. 3A and 3B are schematic diagrams showing external views of a battery charger according to an embodiment of the invention.
Figure 3B:
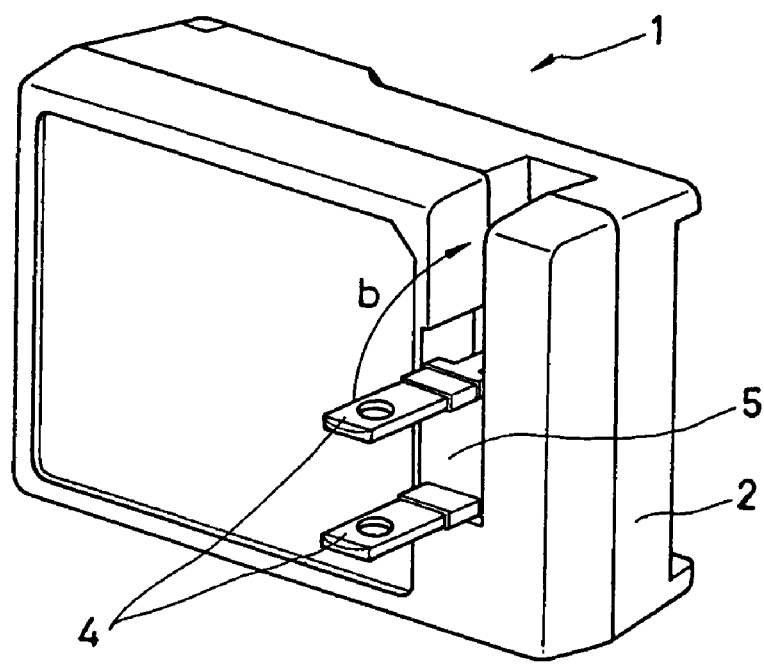

An embodiment of the invention will be described hereinbelow with reference to the drawings. FIGS. 3A and 3B are perspective views showing an example of a battery charger according to an embodiment of the invention. FIG. 3A shows a state where an AC plug 3 which is inserted into an outlet of an AC power source is enclosed in a casing 2 of a battery charger 1. The AC plug 3 has two conductive blades 4 and rotates (lateral rotation) the conductive blades 4 in the direction of an arrow (a) around a rotary shaft of the AC plug 3 as a center, thereby projecting the conductive blades 4 from the casing 2 by about 90°. For example, the battery charger is used to charge a lithium-ion battery which is used for a digital video camera, a digital still camera, or the like.

FIG. 3B shows a state where the AC plug 3 is rotated by about 90° in the direction of the arrow (a) from the state of FIG. 3A and the conductive blades 4 are projected at an almost right angle to the side surface of the casing 2. In this state, the conductive blades 4 can be inserted into the outlet of the AC power source. One end of each of the two conductive blades 4 is supported by, for example, an insulative resin. Further, the conductive blades 4 are supported in parallel with each other at an almost right angle to an edge surface 5 as apart of the supporting portion. The battery charger 1 converts the AC power source which is obtained via the conductive blades 4 into a DC power source and charges the battery. By rotating (lateral rotation) the AC plug 3 by about 90° in the direction of an arrow (b) in FIG. 3B, the AC plug 3 is enclosed in the casing 2 and returned to the state shown in FIG. 3A.

Figure 4A:
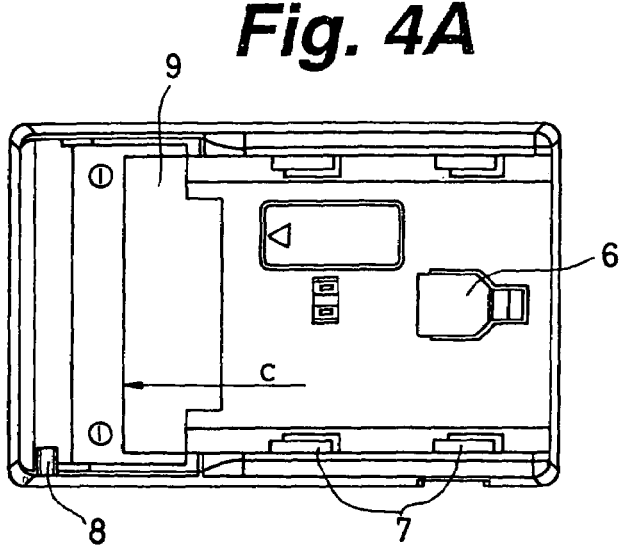
FIGS. 4A to 4D are schematic diagrams showing external views of the battery charger according to the embodiment of the invention in the case where it is seen from different directions.
Figure 4D:
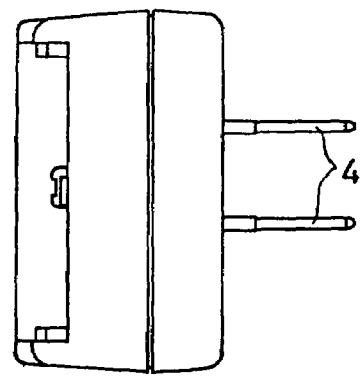
Figure 4B:
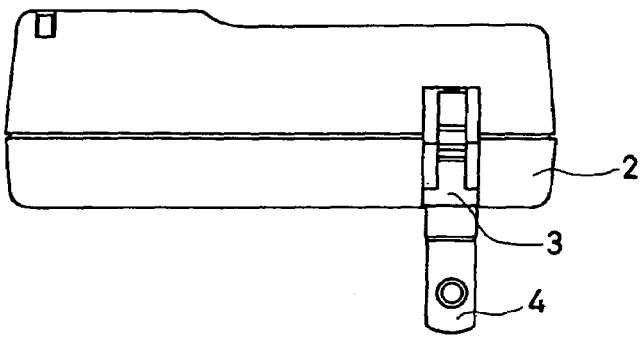
Figure 4C:
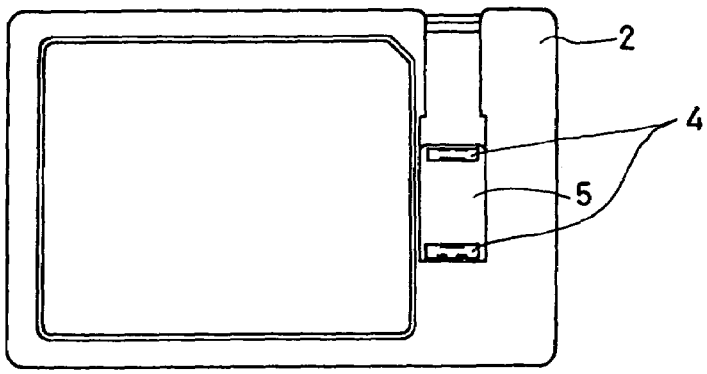

FIGS. 4A to 4D are schematic diagrams showing a state of the battery charger 1 with the projected AC plug 3 in the case where the charger is seen from different directions. FIG. 4A is a top view of the battery charger 1, FIG. 4B is a side elevational view of the battery charger 1, FIG. 4C is a bottom view of the battery charger 1, and FIG. 4D is a front view of the battery charger 1, respectively.

According to the battery charger 1 of the embodiment, a battery as a target to be charged is attached to a groove portion on the left side shown in FIG. 4D. The battery is attached by sliding the battery along the groove portion in the direction of an arrow (c) shown in FIG. 4A and moving it to a position of a front edge of the arrow (c). Thus, terminals of the battery contact the terminal contact portions in a slide shutter 9 and the battery is charged in this state.

FIG. 4A also shows a claw 6 for locking the battery, a hook-shaped pressing member 7, and a charge lamp 8.

Figure 5A:
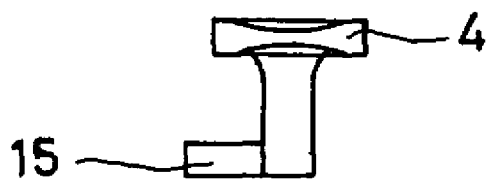
FIGS. 5A to 5C are schematic diagrams showing a construction of a conductive blade of an AC plug according to the embodiment of the invention.
Figure 5B:
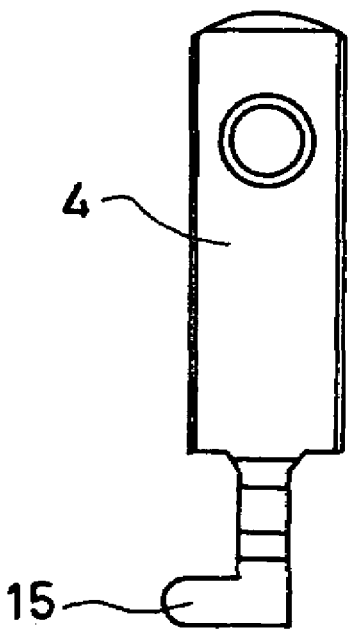
Figure 5C:
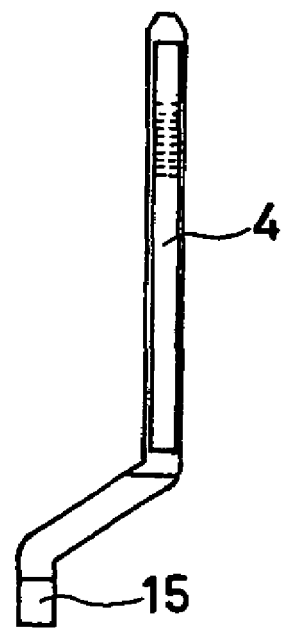

A structure of the AC plug 3 will now be described in detail. FIGS. 5A to 5C are schematic diagrams showing a construction of the conductive blade 4. FIG. 5A is a front view of the conductive blade 4, FIG. 5B is a bottom view of the conductive blade 4, and FIG. 5C is a side elevational view of the conductive blade 4.

As shown in FIG. 3, the AC plug 3 includes the two conductive blades 4 and the conductive blades 4 may have the same shape. As shown in FIG. 5B, one end of the conductive blade 4 has a plate surface of a predetermined width and this portion is inserted into the outlet of the AC power source (hereinafter, this portion is referred to as an inserting portion). A width, a thickness, a length, and the like of this portion are set in accordance with a predetermined standard. The other end of the conductive blade 4 is extended in an L-character shape and its front edge is used as a contact portion 15. By setting the AC plug 3 into a state where it is projected at an almost right angle to the casing 2 of the battery charger 1, the contact portion 15 contacts a conductive spring terminal and supplies the AC power source to a circuit section on the board.

As shown in FIGS. 5A and 5C, the inserting portion and the contact portion 15 are formed almost in parallel and a narrow width portion between them is formed in an obliquely bent shape so as to connect those two portions (hereinafter, such a bent portion is referred to as a narrow width portion). Owing to such a construction, a rotational radius according to the AC plug 3 can be reduced. This point will be explained in detail hereinafter.

Figure 6A:
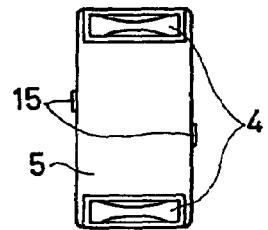
FIGS. 6A to 6D are schematic diagrams showing a construction of the AC plug according to the embodiment of the invention.
Figure 6B:
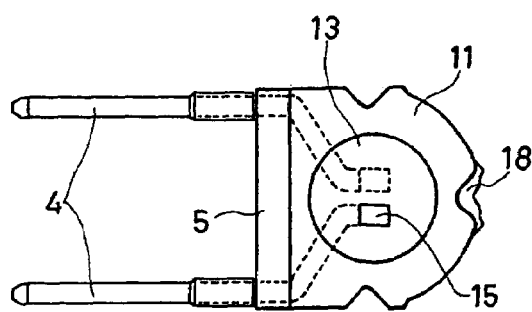
Figure 6C:
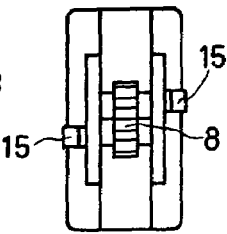
Figure 6D:
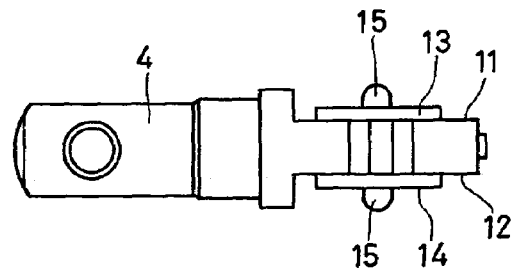

FIGS. 6A to 6D are schematic diagrams showing a construction of the AC plug 3. FIG. 6A is a front view of the AC plug 3, FIG. 6B is a side elevational view of the AC plug 3, FIG. 6C is a rear view of the AC plug 3, and FIG. 6D is a top view of the AC plug 4.

As will be obviously understood from FIG. 6B, the AC plug 3 includes the two conductive blades 4. Mainly, the narrow width portions of the conductive blades 4 are embedded into, for example, an insulative resin or the like, so that the AC plug 3 is supported (portions shown by broken lines in FIG. 6B). The inserting portions and the contact portions 15 are extended to the outside from the insulative resin or the like. As mentioned above, the two conductive blades 4 which are used here have the same shape. Therefore, as shown in FIG. 6D, the contact portion 15 of one conductive blade 4 is extended from a first surface 11 side and the contact portion 15 of the other conductive blade 4 is extended from a second surface 12 side opposite to the first surface 11 side. The two conductive blades 4 come closest to each other at positions where the contact portions 15 are extruded from the insulative resin or the like. The approaching portion is one end of the narrow width portion and is a portion which is connected to the contact portion 15. By using the structure in which the conductive blades 4 are integrated with the insulative resin, a specified distance (insulation distance in the resin) of UL1310 is reduced to 0.8 mm and the two conductive blades can be arranged in very close vicinity to each other.

As shown in FIGS. 6A and 6B, the inserting portions of the two conductive blades 4 are extended at an almost right angle to the edge surface 5 made of an insulative resin or the like and held in parallel with each other.

As shown in FIGS. 6B and 6D, the AC plug 3 has a first rotary shaft 13 and a second rotary shaft 14 projecting from the first surface 11 and the second surface 12, respectively. Those rotary shafts are supported by a structure around a storing portion of the AC plug 3 of the casing 2 of the battery charger 1 and function as rotary shafts at the time when the AC plug 3 is projected from the casing 2 as shown in FIG. 3B.

As shown in FIG. 6B, a concave portion 18 for a clicking mechanism is formed at a right edge of the AC plug 3 and a claw adapted to be fitted into this concave portion is provided for the casing 2. Thus, they function so as to temporarily hold the AC plug 3 in each of the state where the AC plug 3 is enclosed in the casing 2 of the battery charger 1 and the state where the AC plug 3 is projected from the casing 2 of the battery charger 1.

Referring to FIGS. 7A to 7C, a positional relation among the AC plug 3, the casing 2 of the battery charger 1, and the conductive spring terminals will be described. FIGS. 7A to 7C are schematic diagrams showing a peripheral structure in the AC plug 3 and the casing 2. FIG. 7A shows a state where the AC plug 3 is enclosed in the casing 2 of the battery charger 1. FIGS. 7B and 7C show how the two contact portions 15 in the AC plug 3 contact two corresponding conductive spring terminals 17.

As will be understood also with reference to FIGS. 7B and 7C, one contact portion 15 is in contact with the corresponding conductive spring terminal 17 and the other contact portion 15 is in contact with the other corresponding conductive spring terminal 17. In this example, the state where the AC plug 3 is enclosed in the casing 2 of the battery charger 1 is shown. However, a contact state similar to that mentioned above is realized even in a state where the AC plug 3 is projected at an almost right angle to the casing 2 of the battery charger 1. This is because both of the contact portions 15 are rotated by an extremely small rotational radius according to the invention.

As shown in FIG. 7C, the AC power source is supplied to a board 16 via the conductive blades 4, contact portions 15, and conductive spring terminals 17.

Owing to the construction of the invention, the two contact portions 15 are arranged on opposite side surfaces of the AC plug 3 and one end of the narrow width portion of each conductive blade 4 is supported by the insulative resin or the like. Thus, the two conductive blades 4 can be arranged in very close vicinity (for example, at an interval of 0.8 mm) near the rotary shaft of the AC plug 3.

To assure distances from other parts in the board, it is also possible to construct the battery charger 1 in such a manner that the contact portions 15 are not projected from the main body of the AC plug 3 as possible. For example, a distance between the edge portion of one contact portion 15 and the edge portion of the other contact portion 15 can be set to about 8.4 mm (as a distance on the rotary shaft of the AC plug 3).

Figure 8A:
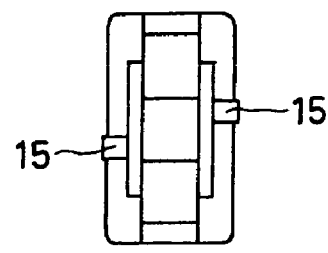
FIGS. 8A to 8D are schematic diagrams which are used to compare the construction and the operation of the AC plug according to the embodiment of the invention with those of a conventional AC plug.
Figure 8B:
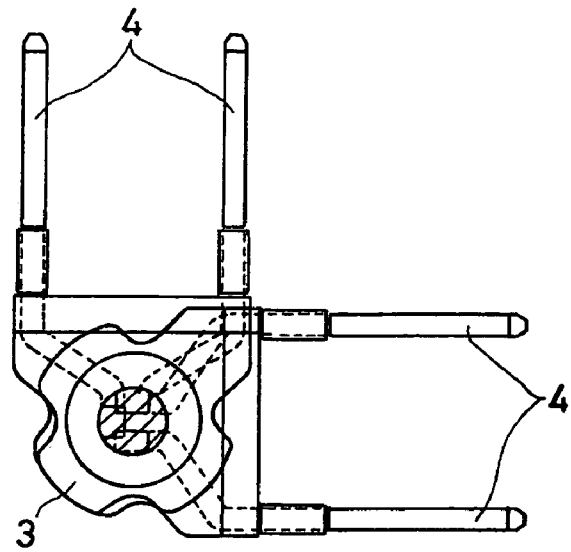
Figure 8C:
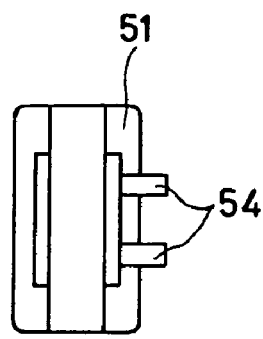
Figure 8D:
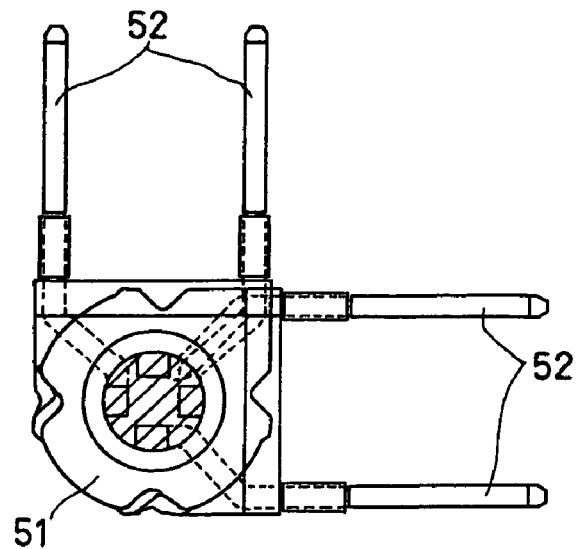

The structure of the AC plug 3 of the battery charger 1 according to the present invention and that of the AC plug 51 of the conventional battery charger mentioned above will now be described with reference to FIGS. 8A to 8D. FIG. 8A is a rear view of the AC plug 3 of the battery charger 1 according to the present invention, similar to FIG. 6C. FIG. 8B is a top view of the AC plug 3 of the invention showing a transition of the state where the AC plug 3 is rotated by about 90°. FIG. 8C is a rear view of the AC plug 51 of the conventional battery charger. FIG. 8D is a top view of the conventional AC plug 51 showing a transition of the state where the AC plug 51 is rotated by about 90°.

As will be understood by comparing FIGS. 8A and 8C, in the AC plug 3 of the battery charger 1 according to the present invention, the contact portions 15 are arranged on both side surfaces of the AC plug 3. Therefore, in the direction which perpendicularly crosses the rotary shaft of the AC plug 3, the interval between the two conductive blades 4 near the rotary shaft of the AC plug 3 can be set to, for example, 0.8 mm and the two contact portions 15 can be allowed to approach the rotary shaft of the AC plug 3 while satisfying safety standard UL1310. In other words, since the portion of the conductive blade near one contact portion and the portion of the conductive blade near the other contact portion are isolated by, for example, the insulative resin or the like, they can be provided in close vicinity. In the invention, the rotational radius of the contact portion 15 can be reduced and the space between each of the peripheral parts can be easily assured. For example, the rotational radius of the contact portion 15 in this case can be set to about 4.30 mm.

On the other hand, in the AC plug 51 of the conventional battery charger, the contact portions 54 are arranged on only one side of the AC plug 51. Therefore, the interval between them in the direction which perpendicularly crosses the rotary shaft of the AC plug 51 has to be set to 6.4 mm or more due to safety standard UL1310. Thus, in the conventional battery charger, the rotational radius of the contact portion 54 is large and it is difficult to assure the space between each of the peripheral parts. For example, the rotational radius of the contact portion 54 in this case is equal to about 6.33 mm or more.

According to the invention, since the portion of the conductive blade near one contact portion and the portion of the conductive blade near the other contact portion are isolated by, for example, the insulative resin, they can be provided in close vicinity. The rotational radius of each of the two contact portions can be suppressed to a small value. Thus, the portions around the rotary shaft of the AC plug can be constructed in a smaller space and the battery charger of a smaller size can be provided.

The numerical values used in the specification are merely shown as an example and other proper values can be used to obtain the effects of the invention. The present invention is not limited to the foregoing embodiment but many modifications and variations are possible within the spirit and scope of the appended claims of the invention.

What is claimed is:

1. A battery charger adapted for connecting to an outlet of an AC power source, converting AC power received from said AC power source into DC power, and charging a battery, the battery charger comprising:

a casing;

a first conductive spring terminal and a second conductive spring terminal mounted on the casing;

a board including a circuit section in electrical communication with said first and second conductive spring terminals; and an AC plug rotatably connected to said casing, the AC plug including:

a first conductive blade having a first end portion, a second end portion opposite the first end portion, and an intermediate portion connecting the first end portion to the second end portion, the first end portion having a plate surface configured for being inserted into said AC power source outlet, the second end portion having a generally L-shaped part including a contact portion;

a second conductive blade having a first end portion, a second end portion opposite the first end portion, and an intermediate portion connecting the first end portion to the second end portion, the first end portion having a plate surface configured for being inserted into said AC power source outlet, the second end portion having a generally L-shaped part including a contact portion;

a supporting portion supporting said first conductive blade and said second conductive blade, the supporting portion having an edge surface that is generally perpendicular to said plate surfaces of the first and second conductive blades, a first side surface that is perpendicular to said edge surface, and a second side surface that is opposite said first side surface and perpendicular to said edge surface;

a first rotary shaft projecting from said first side surface; and a second rotary shaft projecting from said second side surface; wherein:

said contact portion of the first conductive blade projects from the first rotary shaft;

said contact portion of the second conductive blade projects from the second rotary shaft;

said first end portion of each blade is generally parallel to the contact portion of the respective blade;

said intermediate portion of each blade extends between the first end portion and the second end portion of the respective blade obliquely with respect to the first end portion and the second end portion of the blade;

a width, a thickness, and a length of said plate surfaces correspond with a predetermined standard;

the AC plug is adjustable between a first state in which the first and second conductive blades are stored within said casing and a second state in which the blades extend at generally right angles with respect to the casing;

said contact portions of the first conductive blade and the second conductive blade contact said first conductive spring terminal and said second spring terminal, respectively, when the AC plug is in the second state; and when the first conductive blade and the second conductive blade are connected to said AC power source outlet during use of the battery charger, AC power is transmitted to said circuit section of said board by way of the blades and the conductive spring terminals.

2. A charger according to claim 1, wherein:

a portion of said first conductive blade near said first contact portion and a portion of said second conductive blade near said second contact portion are closely arranged in said supporting portion; and includes insulative material.

3. A charger according to claim 1, wherein:

said supporting portion of the AC plug has another surface opposite said edge surface including a concave portion; and said casing includes a claw corresponding to said concave portion.

* * * * *